(12) United States Patent
Radavicius et al.

(10) Patent No.: US 8,248,733 B1
(45) Date of Patent: Aug. 21, 2012

(54) SHIPPING COMB AND RAMP FOR DISK DRIVE ASSEMBLY

(75) Inventors: Arturas Radavicius, San Jose, CA (US); Craig W. Congdon, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 244 days.

(21) Appl. No.: 12/823,965

(22) Filed: Jun. 25, 2010

(51) Int. Cl.
G11B 21/22 (2006.01)

(52) U.S. Cl. .................................................. 360/254.7

(58) Field of Classification Search ............... 360/265.7, 360/255.7, 255.6, 254.8, 254.7; 29/603.03
See application file for complete search history.

(56) References Cited

U.S. PATENT DOCUMENTS

| | | |
|---|---|---|
| 4,851,943 A | 7/1989 | Perry |
| 5,482,164 A | 1/1996 | Karns |
| 5,826,325 A | 10/1998 | Price et al. |
| 5,984,104 A | 11/1999 | Schott et al. |
| 6,344,950 B1 | 2/2002 | Watson et al. |
| 6,452,753 B1 | 9/2002 | Hiller et al. |
| 6,577,473 B1 | 6/2003 | Macpherson et al. |
| 6,687,093 B1 | 2/2004 | Butler et al. |
| 6,862,154 B1 | 3/2005 | Subrahmanyam et al. |
| 6,941,642 B1 | 9/2005 | Subrahmanyam et al. |
| 6,966,107 B2 | 11/2005 | Jones |
| 7,193,819 B1 | 3/2007 | Chen et al. |
| 7,293,351 B2 * | 11/2007 | Pfeiffer et al. .................. 29/737 |
| 7,433,158 B2 * | 10/2008 | Koh et al. .................. 360/254.7 |
| 7,487,582 B2 * | 2/2009 | Ho et al. .................... 29/603.06 |
| 7,832,083 B2 * | 11/2010 | Son et al. ................... 29/603.03 |
| 8,156,633 B1 * | 4/2012 | Foisy ......................... 29/603.03 |
| 2003/0159273 A1 | 8/2003 | Jones |
| 2005/0223547 A1 | 10/2005 | Pfeiffer et al. |
| 2006/0117558 A1 | 6/2006 | Koh et al. |
| 2007/0030599 A1 | 2/2007 | Son |
| 2007/0163105 A1 | 7/2007 | Son et al. |

* cited by examiner

Primary Examiner — Angel A. Castro

(57) ABSTRACT

A disk drive under assembly is disclosed that comprises a suspension assembly that includes a head gimbal assembly (HGA) that has a lift tab and a shipping comb that includes a protruding member that extends from the shipping comb and a bearing member that supports the suspension assembly, in which the lift tab extends beyond the bearing member. The disk drive under assembly further comprises a ramp that includes a receiving portion to receive the protruding member as the shipping comb couples with the ramp to transfer the lift tab to the ramp.

22 Claims, 5 Drawing Sheets

SHIPPING COMB AND RAMP FOR DISK DRIVE ASSEMBLY

BACKGROUND

A huge market exists for hard disk drives for mass-market computer systems such as servers, desktop computers, laptop computers, and mobile computers (e.g., PDAs and cell phones). To be competitive in this market, a hard disk drive should be relatively inexpensive, and should accordingly embody a design that is adapted for low-cost mass production. Further, there exists substantial competitive pressure to continually develop hard disk drives that have increasingly higher storage capacity, that provide for faster access to data, and at the same time conform to decreasingly smaller exterior sizes and shapes often referred to as "form factors."

Satisfying these competing constraints of low-cost, small size, high capacity, and rapid access requires innovation in each of numerous components and methods of assembly including methods of assembly of various components into certain subassemblies. Typically, the main assemblies of a hard disk drive are a head disk assembly ("HDA") and a printed circuit board assembly ("PCBA").

The HDA typically includes at least one magnetic disk ("disk"), a spindle motor for rotating the disk, and a head stack assembly ("HSA") that includes a head with at least one transducer for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the head toward the disk; and (3) a flex cable assembly that provides an electrical interconnect with minimal constraint on movement. The PCBA typically includes signals for processing signals and controlling operations.

Within the HDA, the spindle motor rotates the disk or disks, which are the media to and from which the data signals are transmitted via the head of the HGA. The transfer rate of the data signals is a function of rotational speed of the spindle motor, the faster the rotational speed, the higher the transfer rate.

For disk drive manufacturing, the HSA may be shipped together with a shipping comb that separates and protects the heads of the HGAs prior to the integration of the HSA into the HDA to manufacture the disk drive. In the manufacture of a disk drive with a ramp design, the HGA needs to be placed into a rested position on the ramp. The HGA may include a lift tab for resting on the ramp. This assembly may be complicated by the fact that the typical disk drive includes more than one disk and there may be multiple HGAs with read/write heads for reading from or writing to each disk surface. A typical disk drive may have an array of HGAs with read/write heads arranged in opposing pairs.

Unfortunately, loading the lift tabs of the HGAs onto the ramp during the hard disk drive assembly process may be damaging to the HGA if it is not adequately vertically aligned with the ramp. In particular, collisions may occur between the HGA and the ramp during the merge process which amounts to costly yield losses in disk drive manufacturing. Unfortunately, once the HSA is damaged, it is typically scrapped.

Accordingly, a more precise method and apparatus to merge the HGA with the ramp during the manufacturing of disk drives is sought after.

DETAILED DESCRIPTION

Figure 1:
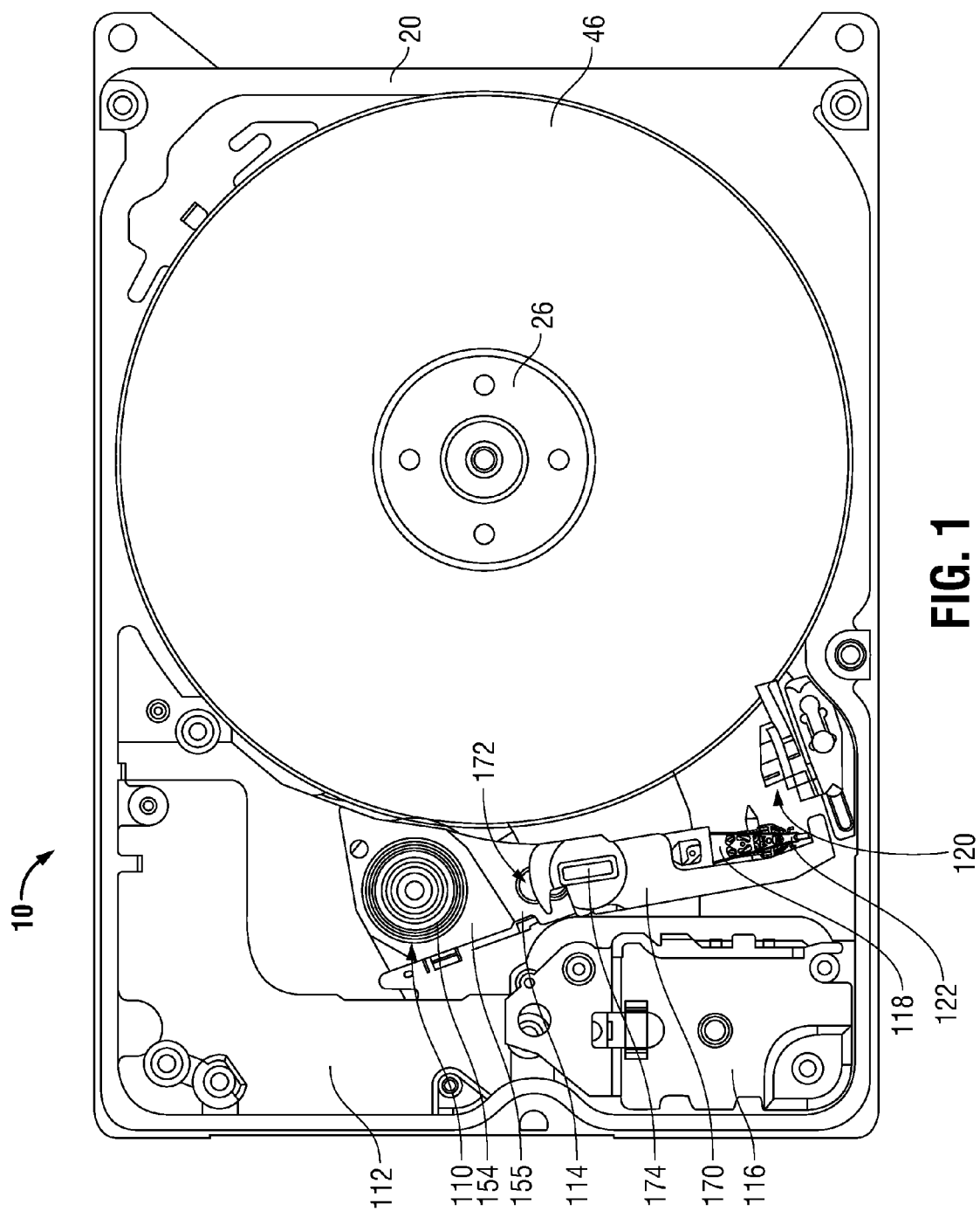
FIG. 1 is a schematic diagram of a hard disk drive with the cover removed, according to one embodiment of the invention.

FIG. 1 is a schematic diagram of a hard disk drive 10 with the cover removed. FIG. 1 shows the components of the hard disk drive 10 assembled within a base plate 20. Disk drive 10 includes a spindle 26, rotatably mounted on the disk drive base 20, for rotating a disk 46 mounted on the spindle 26. Disk drive 10 may only have a single disk 46 or may have multiple disks.

Disk drive 10 may further include a rotary course actuator 110 that is rotatably mounted on the disk drive base 20. The rotary course actuator 110 includes an actuator arm 114 that supports a head gimbal assembly (HGA) 118. Base coil motor 112 rotates the actuator 110 through a limited angular range so that HGA 118 may be desirably positioned relative to one or more tracks of information on the disk 46. Disk drive 10 may include one HGA 118 for each disk surface, but depopulated disk drives are also contemplated in which fewer HGAs are used.

Under non-operating conditions the HGAs 118 may be parked on a ramp 120, for example, to avoid contact with the disk 46 when it is not spinning. Electrical signals to/from HGA 118 are carried to other drive electronics, in part via a flex cable (not shown) and a flex cable bracket 116.

During disk drive operation, the rotary actuator 110 moves a head of the HGA 118 over the disk 46. The rotary actuator 110 may be part of a head stack assembly (HSA). It should be appreciated that HSAs and rotary actuators are well known in the art, and this is but one example.

Looking at this particular example, rotary actuator 110 includes HGA 118 to which a head is mounted, a body portion 155 having a pivot bore for receipt of a pivot bearing cartridge 154. The actuator arm 114 is cantilevered from the body portion 155 and a coil assembly (not shown) is cantilevered from the body portion 155 at an opposite direction from the actuator arm 114 for use by the voice coil motor 112 that rotates the actuator 110. The actuator arm 114 supports HGA 118 which supports a head for writing and reading data to and from the disk 46, respectively. Further, it should be appreciated that the rotary actuator 110 may include a vertical stack of HGAs 118 supported by multiple actuator arms 114 for use with multiple vertically stacked disks 46.

It should be appreciated that many other types of actuators may be utilized, and this is just one example. Furthermore, this is just one example of a hard disk drive (HDD) 10, and a wide variety of different types of disk drives may be utilized with embodiments of the invention. Moreover, in this example, disk 46 is a perpendicular media recording (PMR) disk, however, other types of disks may be utilized.

As can be seen in FIG. 1, the actuator 110 has been placed into position in the disk drive 10 by an approximately L-shaped shipping comb 170. The shipping comb 170 is mounted on top of the actuator arm 114 and through hole 172 of actuator arm 114 to attach to actuator arm 114 and to lower actuator 110 into disk drive 10 for mounting actuator 110 to the base 20 of disk drive 10. Shipping comb 170 may further include a rectangular-shaped handle 174 that may be utilized by an individual or manufacturing equipment to lower shipping comb 170 and actuator 110 into the disk drive 10 to mount actuator 110 to the base 20 of the disk drive 10, and as will be described in more detail later, to rotate actuator arm 110 such that the lift tab 122 of HGA 118 is transferred to ramp 120 and then to rotate shipping comb 170 away from ramp 120 and to remove shipping comb 170 from disk drive 10.

The components of the shipping comb 170, HGA 118, and ramp 120 will be described in more detail in the following paragraphs with reference to the following figures.

Figure 2:
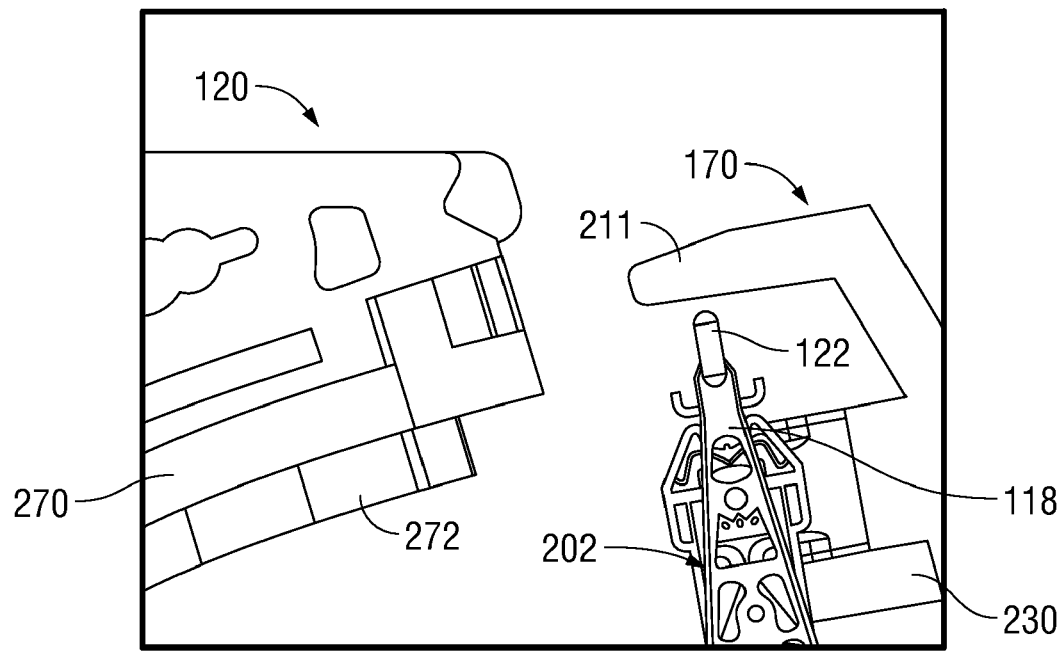
FIG. 2 is a plan section view of a shipping comb and a ramp before HGA merging, according to one embodiment of the invention.
Figure 3:
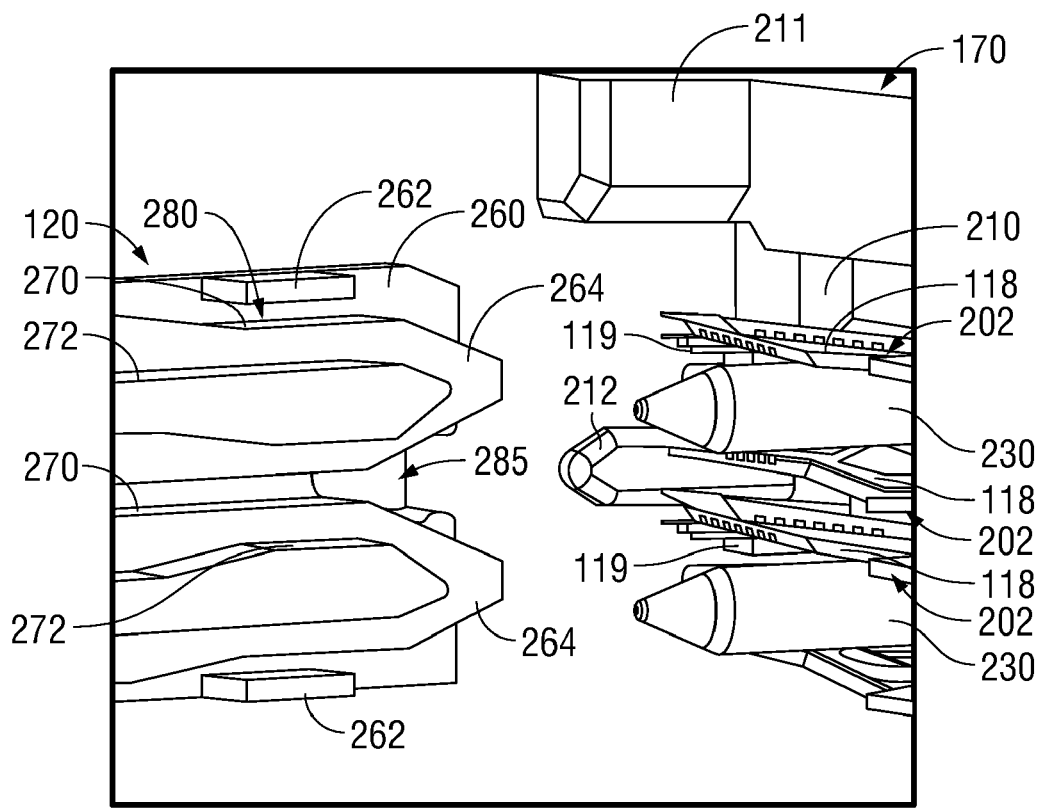
FIG. 3 is a perspective view of a shipping comb and ramp before HGA merging, according to one embodiment of the invention.
Figure 4:
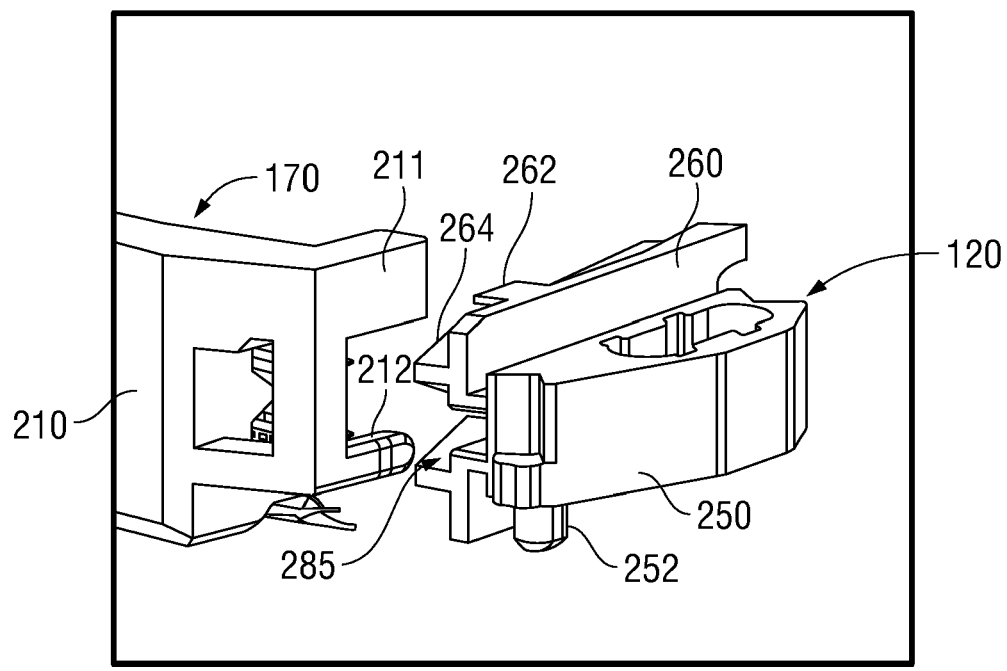
FIG. 4 is a perspective view of a shipping comb and a ramp before HGA merging, according to one embodiment of the invention.

FIG. 2 is a plan section view of shipping comb 170 and ramp 120 before HGA 118 merging, according to one embodiment of the invention. FIG. 3 is a perspective view of shipping comb 170 and ramp 120 before HGA 118 merging, according to one embodiment of the invention. FIG. 4 is a perspective view of shipping comb 170 and ramp 120 before HGA 118 merging, according to one embodiment of the invention.

With reference to FIGS. 2-4, particular features of the shipping comb 170 and ramp 120 will be hereinafter described to illustrate embodiments of the invention. FIGS. 2-4 illustrate the shipping comb 170 and ramp 120 before HGA 118 is merged onto the ramp 120.

As previously described, a disk drive under assembly may include a plurality of actuator arms having suspension assemblies 202 that include HGAs 118 comprising heads 119 and lift tabs 122. The approximately L-shaped shipping comb 170 may comprise a base 210, a top extended portion 211 that extends perpendicularly from base 210, a protruding member 212 that extends perpendicularly from base 210 and a plurality of bearing members 230 that extend perpendicularly from base 210 and support the suspension assemblies 202. As can be seen in FIGS. 2 and 3, the lift tabs 122 extend beyond the bearing members 230.

As can be seen in FIGS. 2-4, in one embodiment, protruding member 212 may be approximately pin-shaped and extends perpendicularly from the base portion 210 of the shipping comb 170 and the bearing members 230 may also be approximately pin-shaped and extend perpendicularly from the base 210 of the shipping comb 170. It should be appreciated that a wide variety of different shapes may be utilized for the protruding member 212 and bearing members 230 and that these are just one example. Further, protruding member 212 is untouched by the lift tabs 122 of the HGAs 118 and there is a wide gap between the lift tabs 122 and the protruding member 212.

Looking at ramp 120, ramp 120 includes a mounting portion 250 having a mounting pin 252 that extends perpendicularly from the mounting portion 250 to mate with a receiving portion protruding from the base of the disk drive (not shown) for the mounting of ramp 120 to the disk drive. Ramp 120 further includes a ramp wall 260 having a plurality of garage walls 262 that extend perpendicularly therefrom and head mounting ramps 264 that extend perpendicularly therefrom that include lift tab slides 270 and head slides 272.

As will be described in more detail hereinafter, when a HGA 118 is merged onto the ramp 120, the lift tab 122 is inserted into a garage 280 formed between a garage wall 262 and a lift tab slide 270 and the head 119 is merged onto a head slide 272.

In particular, according to one embodiment of the invention, ramp 120 includes a receiving portion 285 to receive protruding member 212 as the shipping comb 170 is coupled with the ramp 120 to transfer the lift tabs 122 and the heads 119 to the ramp 120.

In one embodiment, protruding member 212 extends into receiving portion 285 of ramp 120. In particular, the receiving portion 285 may be shaped to engage the protruding member 212 to vertically align the shipping comb 170 and the ramp 120. In one embodiment, receiving portion 285 may be approximately channel-shaped.

As will be more particularly described hereinafter, protruding member 212 engages with the receiving portion 285 while the lift tabs 122 and the heads 119 of the HGAs 118 are positioned onto the lift tab slides 270 and head slides 272 of the ramp 260, respectively, such that they are engaged and transferred to the disk drive.

Figure 5:
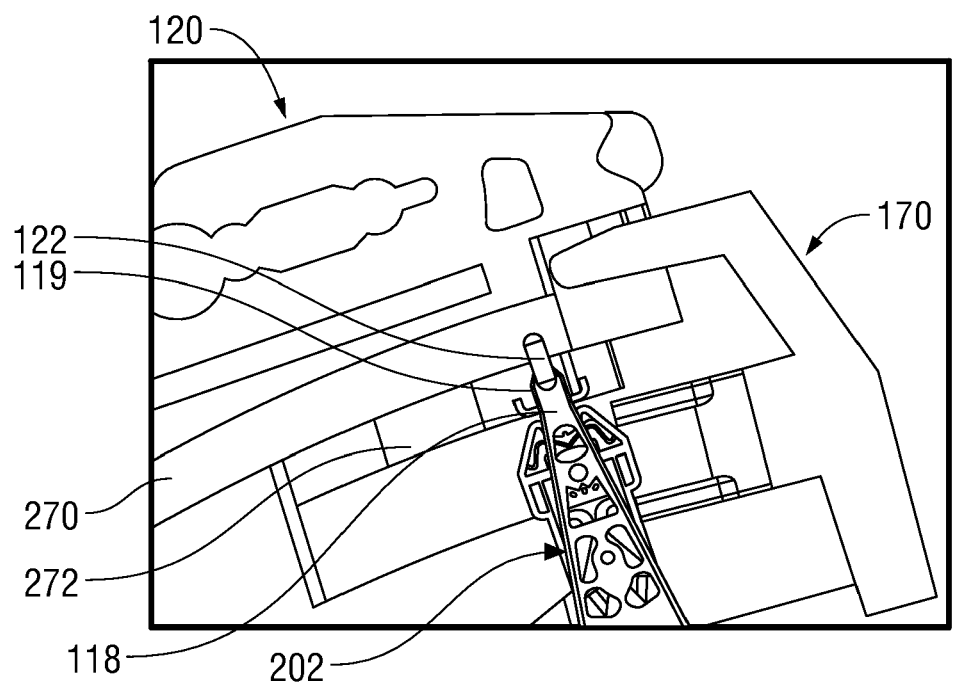
FIG. 5 is a plan section view illustrating an HGA mounted onto a ramp, according to one embodiment of the invention.
Figure 6:
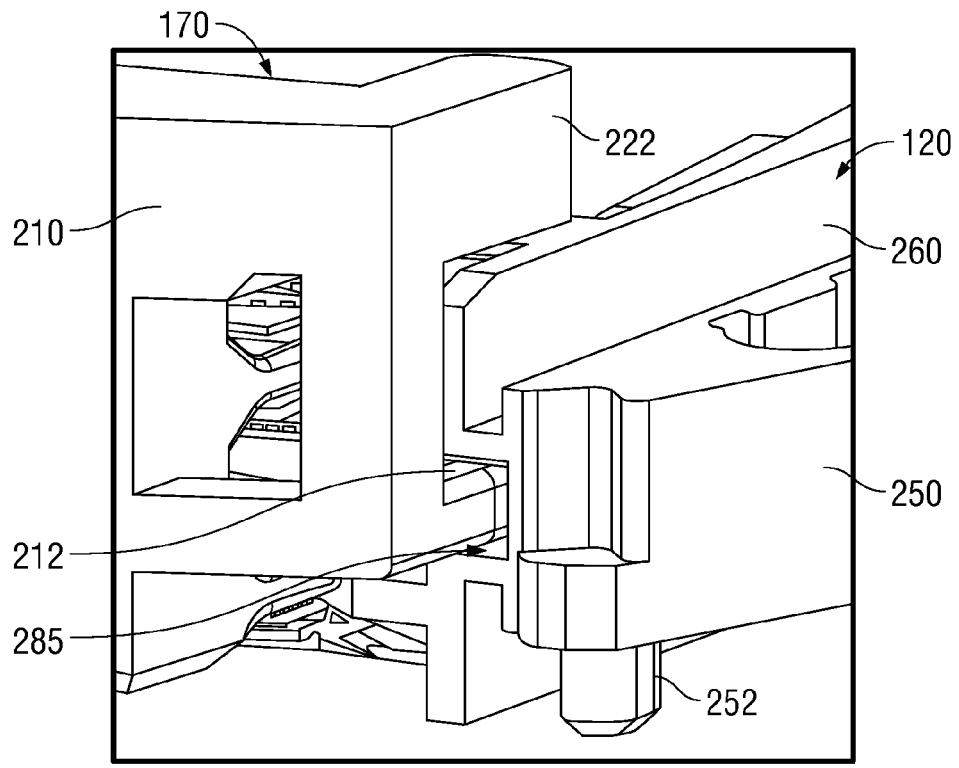
FIG. 6 is a perspective view illustrating a protruding member of a shipping comb fully engaged into a receiving portion of a ramp, according to one embodiment of the invention.

FIG. 5 is a plan section view illustrating the HGA 118 mounted onto the ramp 120, according to one embodiment of the invention. FIG. 6 is a perspective view illustrating the protruding member 212 of shipping comb 170 fully engaged into the receiving portion 285 of ramp 120.

With reference to FIGS. 5 and 6, in the engaged position, receiving portion 285 of ramp 120 receives protruding member 212 of shipping comb 170 such that the shipping comb 170 is fully engaged and coupled with ramp 120. When this occurs, the lift tabs 122 and the heads 119 of the HGAs 118 are positioned onto to the lift tab slides 270 and head slides 272 of the ramp 260, respectively, such that they are engaged and transferred to the disk drive. In this manner, shipping comb 170 is fully engaged with ramp 120 and the HGAs 118 have been merged onto the ramp 120 for use by the disk drive. As will be described hereinafter, after the lift tabs 122 and heads 119 of the HGAs 118 have been transferred to ramp 120, shipping comb 170 is removed from the ramp 120 and the HGAs 118 and the disk drive.

Figure 7:
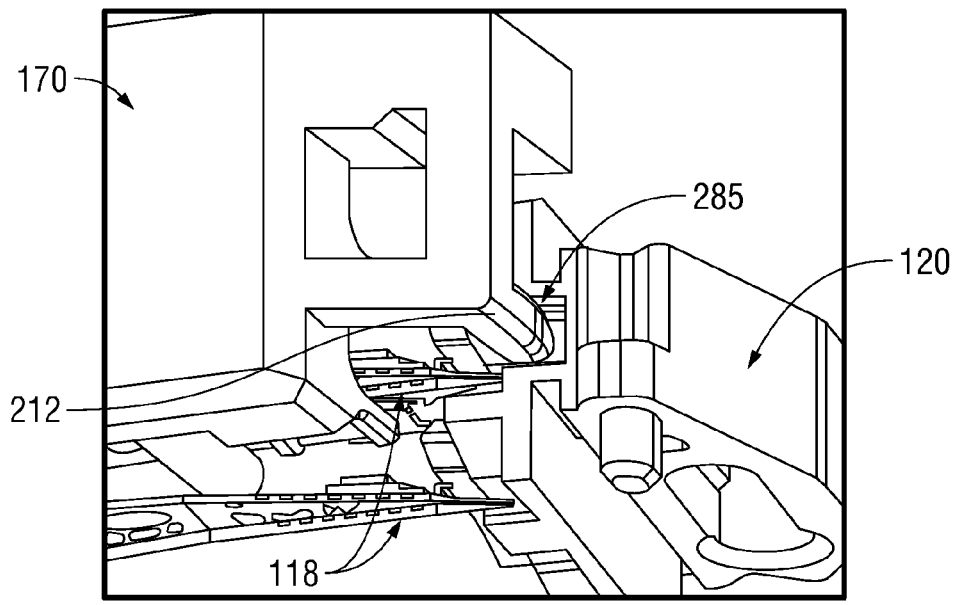
FIG. 7 is a perspective view illustrating a shipping comb being withdrawn from a ramp, according to one embodiment of the invention.

Referring briefly to FIG. 7, FIG. 7 is a perspective view illustrating the shipping comb 170 being withdrawn from ramp 120 after the HGAs 118 have been fully merged onto ramp 120. As can be seen in FIG. 7, protruding member 212 is fully removed from receiving portion 285 of ramp 120.

Figure 8:
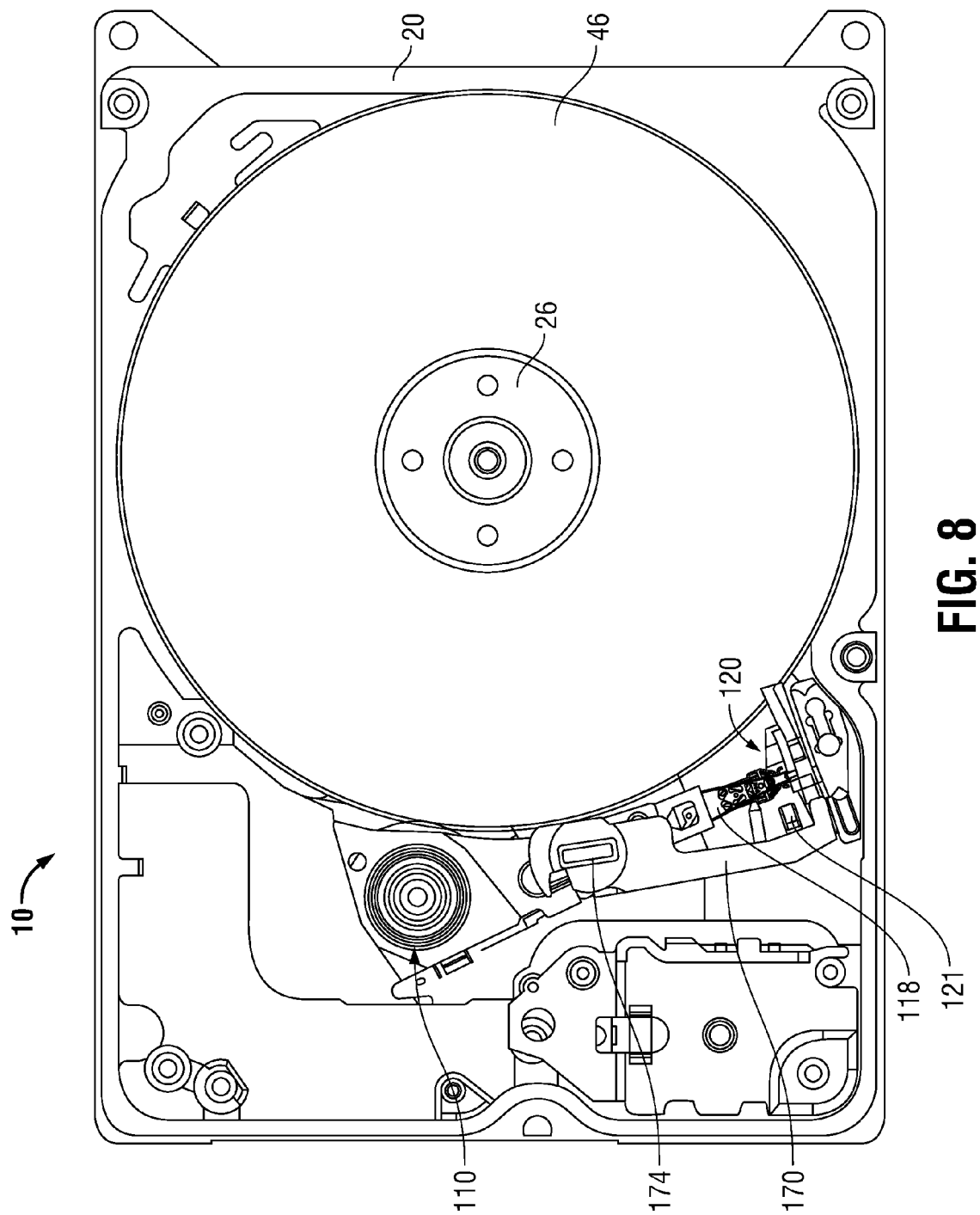
FIG. 8 is a schematic diagram of a hard disk drive with the cover removed, according to one embodiment of the invention.

Further, referring briefly to FIG. 8 which is a top view of hard disk drive 10 with the cover removed, it can be seen that the shipping comb 170 has been rotated away from ramp 120 now that the HGAs 118 of the actuator 110 have been merged onto the ramp 120. The shipping comb 170 may then be removed vertically from disk drive 10 either manually or by a manufacturing instrument by engagement with handle 174.

Thus, according to the embodiments of the invention, the protruding member operates as an alignment pin for the shipping comb 170 to precisely engage the receiving portion of the ramp 120 thereby minimizing misalignment between the shipping comb 170 and the ramp 120 and thereby minimizing damage to the components of the HGA 118 during the merge process. This is advantageous because when the HGA 118 is damaged in the merging process during manufacturing, typically the whole head stack assembly (HSA) needs to be completely replaced, and the HSA is typically the most expensive single item of the hard disk drive.

While embodiments of the invention and their various mechanical and functional components have been described in particular embodiments, it should be appreciated that the embodiments can be implemented with a wide variety of differing mechanical and electrical components, and combinations thereof. Further, although the previous embodiments have been described as being employed for use with disk drives, these embodiments may be implemented with numerous other types of disk drives or other types of storage devices with similar or other media format characteristics.

What is claimed is:

1. A disk drive under assembly comprising:
   a suspension assembly comprising a head gimbal assembly (HGA) including a lift tab;
   a shipping comb comprising a protruding member that extends from the shipping comb and a bearing member supporting the suspension assembly, wherein the lift tab extends beyond the bearing member; and
   a ramp including a receiving portion to receive the protruding member as the shipping comb couples with the ramp to transfer the lift tab to the ramp.

2. The disk drive of claim 1, wherein the protruding member of the shipping comb extends into the receiving portion of the ramp.

3. The disk drive of claim 2, wherein the receiving portion is shaped to engage the protruding member to vertically align the shipping comb and the ramp.

4. The disk drive of claim 3, wherein the receiving portion is approximately channel-shaped.

5. The disk drive of claim 1, wherein the protruding member is approximately pin-shaped.

6. The disk drive of claim 5, wherein the approximately pin-shaped protruding member extends perpendicularly from the shipping comb.

7. The disk drive of claim 1, wherein after the lift tab is transferred to the ramp, the shipping comb is removed from the ramp and the HGA.

8. The disk drive of claim 1, wherein the shipping comb comprises a shipping comb base and the protruding member extends perpendicularly from the shipping comb base.

9. The disk drive of claim 1, wherein the protruding member is untouched by the lift tab.

10. The disk drive of claim 9, further comprising a gap between the lift tab and the protruding member.

11. The disk drive of claim 10, wherein the protruding member engages with the receiving portion while the lift tab engages with the ramp.

12. A method to transfer a head gimbal assembly (HGA) to a ramp comprising:
    mounting a shipping comb to a ramp, wherein the shipping comb includes a protruding member that extends from the shipping comb and a bearing member supporting a suspension assembly that includes the HGA including a lift tab; and
    transferring the lift tab of the HGA to the ramp, wherein the ramp includes a receiving portion to receive the protruding member as the shipping comb couples with the ramp.

13. The method of claim 12, further comprising extending the protruding member of the shipping comb into the receiving portion of the ramp.

14. The method of claim 13, wherein the receiving portion is shaped to engage the protruding member to vertically align the shipping comb and the ramp.

15. The method of claim 14, wherein the receiving portion is approximately channel-shaped.

16. The method of claim 12, wherein the protruding member is approximately pin-shaped.

17. The method of claim 16, wherein the approximately pin-shaped protruding member extends perpendicularly from the shipping comb.

18. The method of claim 12, further comprising removing the shipping comb from the ramp and the HGA after the lift tab is transferred to the ramp.

19. The method of claim 12, wherein the shipping comb comprises a shipping comb base and the protruding member extends perpendicularly from the shipping comb base.

20. The method of claim 12, wherein the protruding member is untouched by the lift tab.

21. The method of claim 20, wherein a gap is located between the lift tab and the protruding member.

22. The method of claim 21, further comprising engaging the protruding member within the receiving portion while the lift tab engages with the ramp.

* * * * *